United States Patent [19]

Möller

[11] 4,259,978

[45] Apr. 7, 1981

[54] HYDRAULIC REGULATOR FOR GENERATION OF A DRIVING SPEED-DEPENDENT PRESSURE

[75] Inventor: Hartmut Möller, Isenbüttel, Fed. Rep. of Germany

[73] Assignee: Volkswagenwerk Aktiengesellschaft, Wolfsburg, Fed. Rep. of Germany

[21] Appl. No.: 110,614

[22] Filed: Jan. 9, 1980

[30] Foreign Application Priority Data

Jan. 11, 1979 [DE] Fed. Rep. of Germany ....... 2900853

[51] Int. Cl.³ .............................................. G05D 13/10
[52] U.S. Cl. ........................................ 137/54; 137/56
[58] Field of Search ................. 74/752 C; 137/54, 56

[56] References Cited

U.S. PATENT DOCUMENTS

| | | | |
|---|---|---|---|
| 3,413,991 | 12/1968 | Lewicki | 137/54 |
| 3,559,667 | 2/1971 | Koivenen | 137/54 |
| 3,566,895 | 3/1971 | Goto | 137/56 |

FOREIGN PATENT DOCUMENTS 1960683 5/1973 Fed. Rep. of Germany .
1902315 7/1976 Fed. Rep. of Germany .

Primary Examiner—Robert G. Nilson
Attorney, Agent, or Firm—Brumbaugh, Graves, Donohue & Raymond

[57] ABSTRACT

A regulating device is comprised of a shaft which is driven at a speed of revolution proportional to the speed of an automobile, and a duct provided in the shaft and connected for fluid transmission from a pressurized fluid source and the control means for the automatic automobile transmission. The duct has two pressure control openings, each of which has a pressure release valve. The first of the pressure release valves is loaded with a relatively large-mass flyweight mounted to one axial end of the shaft and, upon rotation of the shaft, urges its respective pressure release valve toward the closing position. The other pressure release valve is biased closed by a spring and is loaded with a relatively small flyweight which, upon the rotation of the shaft, urges its respective pressure release valve toward the closing position. The present invention includes a third flyweight which acts on the spring to increase the closing force exerted on the second flyweight.

4 Claims, 4 Drawing Figures

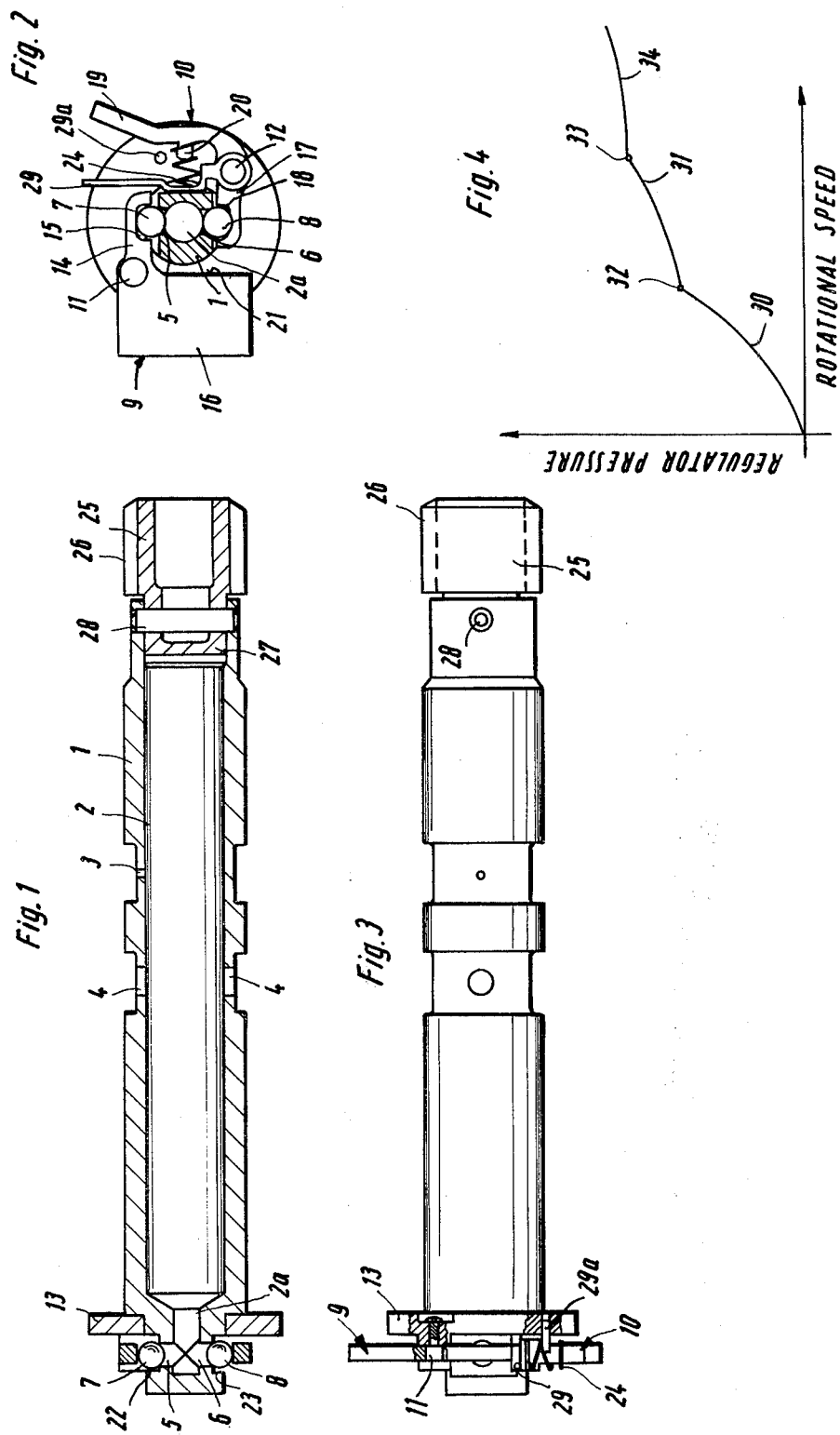

HYDRAULIC REGULATOR FOR GENERATION OF A DRIVING SPEED-DEPENDENT PRESSURE

BACKGROUND OF THE INVENTION

The present invention relates to a hydraulic regulating device which is used to regulate speed-dependent pressure supplied to the control means of an automatic automobile transmission. Specifically, this type of regulating device, which controls the speed-dependent pressure by means of two pressure release valves loaded by flyweights, has been improved by the addition of a third flyweight mounted to interact with one of the other flyweights to provide improved control of hydraulic fluid pressure variation with speed.

The improvement of the present invention is directed towards hydraulic regulating devices of the type that is disclosed, for example, in German letters of disclosure No. 1,960,683, publicly laid open June 25, 1970. These regulating devices include a primary shaft which has a duct which provides a supply of hydraulic fluid from a pressurized hydraulic fluid source to a control mechanism for an automatic automobile transmission. In order to meet the varying fluid demands of the control mechanism at varying vehicle speeds, the duct has two pressure release valves which control fluid pressure by permitting hydraulic fluid to flow out through two pressure control openings. The pressure release valves are loaded by flyweights mounted on the regulating device and responding to rotation of the primary shaft. The centers of gravity of the flyweights are located laterally from the shaft axis so that upon rotation of the regulator shaft, centrifugal force causes the flyweights, which act directly on the pressure release valves, to urge the release valves toward the closing position.

When the performance of this type of regulator device is characterized by a graph plotting regulated fluid pressure against vehicle speed, a curve consisting of two parabolic arcs which intersect at one point results.

It has been found that this characteristic hydraulic fluid pressure curve reveals a regulator performance which is not, at all times, sufficient to meet the demands made for transmission control. The demands of the automatic transmission control are best met when the characteristic curve produced by the regulator is relatively flat. Furthermore, regulators of this type, known to date, require flyweights which are relatively complex in shape and which must be fabricated with a high degree of precision in order to ensure the most constant characteristic possible.

It is therefore an object of the present invention to provide a regulator device to regulate the speed-dependent pressure for the control mechanism of an automatic automobile transmission which achieves a characteristic curve flatter than the characteristic curves of other pressure regulators of this kind.

It is a further object of the present invention to provide such an optimally performing regulating device having flyweights which have shapes that are simply and economically attainable and which may be more conveniently arranged on the device.

SUMMARY OF THE INVENTION

In accordance with the present invention there is provided an improvement in a hydraulic pressure regulating device which is used to regulate speed-dependent pressure supplied to the control means of an automatic automobile transmission. The hydraulic pressure regulating device includes the shaft which is driven at a speed of revolution proportional to the speed of the automobile and is provided with a duct which is connected for fluid transmission from a hydraulic fluid source to a control means for an automatic automobil transmission. The duct is also provided with two pressure control openings each of which has a respective pressure release valve. The pressure release valves, in turn, are loaded with flyweights mounted to the end of the shaft. One of the pressure release valves is loaded with a relatively large-mass flyweight and the other pressure release valve is loaded with a smaller-mass flyweight which also has a spring that urges the second flyweight, and consequently, the second release valve toward the closing position. The improvement of this invention is a third flyweight which is mounted to the same end of the regulator shaft as the other flyweights and which, upon rotation of the shaft, acts upon the spring which loads the second flyweight so that the closing force exerted on the flyweight is increased, thereby also increasing the closing force exerted on the second pressure release valve.

The shaft may also be provided with a means for limiting the deflection which is caused by the centrifugal force of the third flyweight, thereby also limiting the amount of force which may be exerted on the second flyweight by the third flyweight.

The third flyweight may be a one-arm lever which is mounted to the same support means to which the second flyweight is mounted and located between the shaft of the regulator and the spring which acts on the second flyweight. All the flyweights of the hydraulic regulating device may be mounted to support pins which are parallel to the axis of the shaft of the regulator and which are eccentrically positioned relative to the axis.

Due to the configuration of the present invention, a pressure regulating device is achieved which is characterized by a performance curve of the type referred to hereinbefore which is composed of the intersecting parallel arcs. The first arc depicts the operation of the larger-mass, first flyweight which, at lower driving speeds, determines the regulator pressure by itself.

At higher driving speeds the first relatively large-mass flyweight closes the first pressure release valve and the two smaller flyweights which act in conjunction to control bleeding off of pressurized hydraulic fluid through the second flow-off opening. It is this cooperative interaction between the two smaller flyweights which provides a characteristic pressure versus speed curve having second and third parabolic arcs. Initially, both smaller flyweights, which are coupled with each other by way of the spring, act jointly on the second pressure release valve. As the speed increases, the third flyweight continues to deflect outwardly by the centrifugal force until it bears against a stop. From the speed on, the only force acting against the second release valve is that of the second flyweight and a practically constant spring force.

By the foregoing, a three-arc regulator characteristic is formed which, when viewed as a whole, shows a relatively flat rise of the regulator pressure over the range of driving speeds. Furthermore, by the present invention such a favorable performance characteristic is achieved while, at the same time, minimizing the overal axial length of the regulating device.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 1 is a longitudinal section through a hydraulic fluid regulating device in accordance with the present invention.

FIG. 2 is a partly sectional end view of the regulator shown in FIG. 1.

FIG. 3 is an elevated side view of the regulator shown in FIGS. 1 and 2.

FIG. 4 is a graph of hydraulic fluid pressure as a function of speed for the regulator of the present invention.

DESCRIPTION OF THE INVENTION

Referring to FIGS. 1 through 3, there is shown a regulating device for hydraulic fluid according to the present invention which is composed primarily of a hollow shaft 1 having an axially extending duct 2 which is connected to a hydraulic fluid source, such as a pump, by way of throttle bore 3 and also to a consuming means, e.g. the control of an automatic automobile transmission, through radial bores 4. The pressure of the hydraulic fluid, in accordance with the present invention, which is conveyed to the consuming device is varied depending on the speed of the vehicle. For that reason, the regulator shaft 1 is driven at a driving speed-proportional rotation rate by means of a plug 25 which is provided with outer toothing 26 and is secured to the shaft 1 by cylindrical projection 27 which fits into the axial bore forming the duct 2. A cross pin 28 secures the plug 25 to the axial bore.

At the opposite axial end of the shaft 1 there is provided pressure control openings 5 and 6 which are connected to the main bore 2 through a bore shoulder 2a. Pressure control openings 5 and 6 are opposite each other and extend radially from the bore shoulder 2a and are controlled by ball valves 7 and 8.

Viewing the pressure release end of the regulator shaft, as shown in FIG. 2, flyweights 9 and 10 are seen as two-armed levers having arms 14 and 16 (for flyweight 9) and arms 17 and 19 (for flyweight 10) which are arranged perpendicular to each other and supported respectively by pins 11 and 12. Arms 14 and 17 are provided with clearances 15 and 18, which secure ball valves 7 and 8, respectively, in the radial and circumferential directions. Upon rotation of the regulator shaft, centrifugal force causes the arms 16 and 19 to be pushed radially outward from the shaft, thereby exerting a closing force by way of arms 14 and 17, respectively, onto ball valves 7 and 8. The pivoting pins 11 and 12 are maintained on a radially extending flange 13 of the regulator shaft 1 which also may serve as a stop for the regulator shaft. Arms 16 and 19 include abutments 20 and 21, respectively, which prevent a swinging motion of the flyweights in the direction opposite to that of the centrifugal force. Also clearances 22 and 23 are provided between the end of the shaft 1 and the flange 13 in order to restrict the axial movement of ball valves 7 and 8.

A third flyweight 29 is supported on the pivoting pin 12, which also supports the second flyweight 10, and extends from the pivoting pin essentially tangentially to the regulator shaft 1. A spring 24 is placed between the third flyweight 29 and the second flyweight 10 so that it constantly loads the second flyweight 10 toward the closing position. The third flyweight (29) end of the spring 24 is enclosed by an offset portion of the flyweight 29. A stop pin 29a is fixed on the flange 13 to limit the deflection of the flyweight 29 during rotation of the shaft.

The magnitude of the pressure that is conveyed through the outlet bore 4 to the hydraulic fluid consuming device, such as a control for automatic automobile transmission, depends essentially upon the bleeding off of pressurized hydraulic fluid from the axial duct 2 of the regulator shaft 1 which, in turn, is controlled by the ball valves 7 and 8. The opening of the valves 7 and 8 depend upon the imbalance of the forces exerted on them by the pressure of the hydraulic fluid which passes through the duct 2 and by the closing force generated by the flyweights which, in turn, is a function of the rotational speed of the regulator shaft 1.

When the regulator is in a rest position, the only force at work is the pressure exerted by the spring 24 on the two smaller-mass flyweights 10 and 29. This force urges the third flyweight 29 in the counterclockwise direction against the regulator shaft while it urges the second flyweight 10 in the clockwise direction—the closing direction of the valve 8. Once the shaft begins to rotate, there is exerted against ball valves 7 and 8 the pressure that is created by centrifugal force acting on the flyweights. As the number of revolutions increases, there is generated a constantly increasing closing force on the ball valves which causes an increase of the regulator pressure. FIG. 4 is a graph which characterizes the operation of the regulator by a curve which plots the regulator pressure against the vehicle speed.

At a low number of revolutions the combined force of flyweights 29 and 10, in addition to the force exerted by spring 24 acting against flyweight 10, is greater than the centrifugal force exerted by flyweight 9 against valve 7. As a result, in the low driving speed ranges the valve 7 is open, thereby allowing pressurized hydraulic fluid to escape through pressure control opening 5. The curve 30 characterizes the plot of the valves of the regulator pressure against the vehicle speed when the valve 7 is open. When a vehicle speed is attained at which the pressure exerted by the centrifugal force acting on flyweight 9 is greater than the combined force of flyweight 29, flyweight 10 and spring 24, the pressure release valve 7 is closed and valve 8 is opened, allowing the pressurized hydraulic fluid to escape through pressure control opening 6. This point is indicated by point 32 on the graph.

After this speed is reached, essentially all the bleeding of pressurized hydraulic fluid is conducted through pressure control opening 6. Parabolic arc 31 of FIG. 4 corresponds to the performance of the regulator immediately after the closing of valve 7 and the opening of valve 8. Over the next range of vehicle speeds the centrifugal force of the third flyweight 29 acts on the spring 24 and ultimately on the second flyweight 10 until a speed is reached at which the third flyweight 29 comes to butt against the stop pin 29a. This point is indicated by the intersection 33 of arcs 31 and 34.

At driving speeds after which the third flyweight 29 has been stopped by the pin 29a, the remaining course of the regulator pressure—parabolic arc 34—is then determined only by the centrifugal force and the force of spring 24 acting on the second flyweight 10, since the increasing force component previously attributable to flyweight 29 has been eliminated.

Seen in its entirety, therefore, a regulator performance is depicted by a relatively flat course which up to very high driving speeds does not result in excessively large regulator pressures.

While there has been described what is believed to be the preferred emobodiment of the invention, those skilled in the art will realize that changes and modifications may be made thereto without departing from the spirit of the invention, and it is intended to claim all such changes and modifications as fall within the true scope of the invention.

I claim:

1. In a hydraulic pressure regulating device used to regulate a speed-dependent pressure supplied to control means in an automatic automobile transmission, wherein a shaft is driven at a speed of revolution proportional to the speed of the automobile, wherein there is provided a duct in said shaft connected for fluid transmission from a hydraulic fluid source, and to said control means and wherein said duct is provided with first and second pressure control openings, each having a respective pressure release valve, the first of said pressure release valves being loaded with a relatively large-mass flyweight mounted to one axial end of said shaft which, upon rotation of said shaft, urges said first pressure release valve toward the closing position and the second of said pressure release valves being loaded with a relatively small flyweight mounted to said one axial end of said shaft which, upon said rotation, urges said second release valve toward the closing position, said second flyweight being provided with a spring which also urges said second flyweight and, consequently said second release valve, toward said closing position, the improvement wherein there is provided a third flyweight mounted to said one axial end of said shaft which, upon said rotation, acts on said spring to increase the closing force exerted on said second flyweight and thereby increases the closing force exerted on said second pressure release valve.

2. The regulator device described in claim 1 wherein there is provided means for limiting the deflection of said third flyweight under the influence of said rotation so that said force exerted on said second flyweight by said third flyweight is also limited.

3. The regulator device as described in claim 1 or 2 wherein said thrid flyweight comprises a one-arm lever pivotably mounted at one end to a support means to which said second flyweight is also mounted, said one-arm lever located between said shaft and said spring.

4. The regulator device as described in any of claims 1 to 3 wherein said flyweights are pivotably mounted to support pins which are parallel to the axis of said shaft and eccentrically positioned relative to said axis.

* * * * *